United States Patent [19]

Baradel et al.

[11] Patent Number: 4,737,350

[45] Date of Patent: Apr. 12, 1988

[54] PROCESS FOR SEPARATING ARSENIC FROM ACID SOLUTIONS WHICH CONTAIN IT

[75] Inventors: Agostino Baradel, San Donato Milanese; Renato Guerriero, Mestre-Venice, both of Italy

[73] Assignee: Nuova Samim S.p.A., Rome, Italy

[21] Appl. No.: 44,899

[22] PCT Filed: Jul. 23, 1986

[86] PCT No.: PCT/EP86/00437

§ 371 Date: Mar. 26, 1987

§ 102(e) Date: Mar. 26, 1987

[87] PCT Pub. No.: WO87/00867

PCT Pub. Date: Feb. 12, 1987

[30] Foreign Application Priority Data

Aug. 1, 1985 [IT] Italy ............................... 21825 A/85

[51] Int. Cl.$^4$ .............................................. C01B 27/00
[52] U.S. Cl. .............................. 423/87; 204/DIG. 13; 423/24
[58] Field of Search ................................... 423/24, 87; 204/DIG. 13

[56] References Cited

U.S. PATENT DOCUMENTS 4,411,698 10/1983 Badesha ............................... 423/510
4,547,346 10/1985 Guerriero et al. ..................... 423/87

FOREIGN PATENT DOCUMENTS 114830  9/1981 Japan ..................................... 423/87
 38324  3/1982 Japan ..................................... 423/87
569259 10/1978 U.S.S.R. ................................. 423/87

*Primary Examiner*—John Doll
*Assistant Examiner*—Wayne A. Langel
*Attorney, Agent, or Firm*—Hedman, Gibson, Costigan & Hoare

[57] ABSTRACT

A process for separating arsenic from acid aqueous solutions containing arsenic and other metal ions. The process involves bringing the acid aqueous solution into contact with a water-immiscible organic diluent consisting of hydrocarbons, alcohols or their mixtures, in which there is dissolved as solvent at least one polyol. The solvent thereby extracts the arsenic, which is then re-extracted with a counter-solvent.

10 Claims, No Drawings

PROCESS FOR SEPARATING ARSENIC FROM ACID SOLUTIONS WHICH CONTAIN IT

This invention relates to a process for separating arsenic from acid solutions which contain it.

More particularly, the invention relates to a process for separating arsenic from sulphuric solutions of copper and other ions.

Still more particularly, the invention relates to a process for separating pentavalent arsenic from acid solutions, in particular sulphuric solutions of copper or other ions.

Almost all commercial copper is produced by electrolytically refining a raw material comprising about 99.5% of Cu and containing As together with many other extraneous elements. This raw material (blister copper), after suitably remelting and casting into slabs, forms the anode of an electrolytic cell, the cathode of which can be a slab of copper or, in more modern plants, stainless steel or titanium.

The electrolyte is a copper sulphate solution containing much free sulphuric acid.

On passage of electric current, copper dissolves from the anode and simultaneously deposits on the cathode. Of the impurities contained in the anode, some remain undissolved and form the so-called "anode mud", whereas others (elem-ents less nobel than copper) dissolve electrochemically. One of these is arsenic, which therefore constantly increases in concentration and has to be removed in order to prevent product contamination.

There are also other metallurgical problems in which arsenic control and removal are very important. This problem exists in the case of copper recovery by sulphuric electrolysis with insoluble anodes from residues such as the copper froth originating from purification operations in the primary metallurgy of lead.

The input-output equilibrium of arsenic (and of the other impurities) must therefore be controlled, and in a known method a part of the copper electrolyte is periodically deviated from the cycle, and this is subjected to multi-stage electrolytic separation to eliminate the As in the form of a Cu-As alloy. However, when solutions poor in coper but rich in arsenic are electrolysed, there is the risk of arsine evolution, an extremely toxic gas, and special arrangements and precautions are therefore required.

In addition, the subsequent recycling of the alloy sometimes gives rise to problems of a technical and cost nature. A more simple process for selectively removing arsenic from the copper electrolyte or in any event from strongly acid solutions is therefore of particular interest.

Methods are already known, consisting of extracting arsenic from the copper electrolyte using suitable organic solutions, which have tributylphosphate as their main active component. The arsenic can be re-extracted from these solutions with water or acid or alkaline aqueous solutions, and separated by precipitation either as the sulphide by using hydrogen sulphide or alkaline sulphides, or as arsenic trioxide by using sulphur dioxide or sulphites.

For example, German patent application No. 2603874 claims substantially the separation of arsenic from copper in acid solutions containing sulphuric acid, by carrying out the extraction with hydrocarbon solutions containing between 50 and 75% of tributylphosphate together with 5% or less of a high-boiling alcohol, the explicitly stated purpose of which is to prevent the formation of a third phase thus increasing the arsenic concentration in the organic phase.

German patent application No. 2615638 claims the use of a trialkyl, triaryl or triarylalkylphosphate, preferably tributylphosphate, diluted in a hydrocarbon medium and containing small quantities of isodecanol as an emulsion inhibitor.

British Pat. No. 1551023 claims the use of a solution in the form of a hydrocarbon medium containing between 40 and 75% of tributylphosphate and up to 15% of a quaternary ammonium salt, preferably tricaprylylmethylammonium chloride (Aliquat 336) or a mixture of methyl tri($C_8$–$C_{10}$)alkylammonium chlorides (Adogen 464).

All the three cited cases use substantial quantities of tributylphosphate, a considerably toxic substance, and in the third case there is a further increase in toxicity of the organic extraction mixture due to the addition of a quaternary ammonium salt. Belgian Pat. No. 900107 of the present applicant describes a process for separating arsenic from acid solutions which contain it, by bringing the arsenic-containing solution into contact with a water-immiscible organic solvent containing as active components for the arsenic extraction one or more alcohols with at least six carbon atoms.

Although the process of said Belgian patent allows considerable separation of trivalent arsenic, it does not allow effective removal of pentavalent arsenic other than after reduction of the pentavalent arsenic to trivalent arsenic, for example by means of sulphur dioxide.

It has been surprisingly found possible to separate arsenic, including pentavalent arsenic, from copper electrolyte or in general from acid solutions containing other metal ions in a simple and economical manner, with high efficiency, by simply extracting the arsenic with a water-immiscible organic diluent containing polyols, thus avoiding the use of the aforesaid toxic substances and the need for reduction ot a valency of three. The process according to the present invention comprises bringing the copper electrolyte containing arsenic or in general the acid aqueous solution containing ions of arsenic and of other metals, into countercurrent or cocurrent contact with a water-immiscible organic diluent consisting essentially of hydrocarbons, alcohols or their mixtures, in which there is dissolved as solvent at least one polyol, particularly and preferably a diol, said solvent extracting the arsenic which is then re-extracted with a counter-solvent.

The solvent polyols which can be used according to the process of the present invention include diols having 7 or more carbon atoms, and triols having 10 or more carbon atoms. Particularly suitable diols include octane-1,2-diol, decane-1,2-diol, dodecane-1,2-diol, tetradecane-1,2-diol and hexadecane-1,2-diol. Phenylethane-1,2-diol, 2-phenylpropane-1,2-diol, 2-ethylhexane-1,3-diol, 2-methyl-2-propylpropane-1,3-diolo, 2,2-dimethylhexane-3,5-diol, octane-1,8-diol, dodecane-1,12-diol and 4-octylcyclohexane-1,2-diol also deserve mention.

The polyol concentration in the diluent is between 1 and 60%, and preferably between 4 and 40%.

Aliphatic, aromatic and naphthenic hydrocarbons, monohydric alcohols and other compounds can be used, either alone or in mixture, as diluents.

It is essential that the diluents are good polyol solvents and are practically insoluble in the aqueous phase. The ratio of the organic phase (diluent plus solvent) to the aqueous phase can vary from 0.1 to 10 and preferably from 0.5 to 5.

The arsenic can be re-extracted from the organic phase without difficulty, using a counter-solvent consisting of alkaline solutions such as 1N NaOh, neutral solutions, water or acid saline solutions such as 0.1M $H_2SO_4$.

A neutral or alkaline aqueous solution is preferably used.

The examples given hereinafter illustrate the main aspects of the invention, but in no case do they constitute a partial or total limitation to the scope of the invention.

EXAMPLE 1

20 ml of an aqueous solution containing:
200 g/l of sulphuric acid
45 g/l of copper
6.1 g/l of trivalent arsenic
are fed into a cylindrical separating funnel. 40 ml of 2-ethylhexanol are added, and the mixture shaken energetically for 10 minutes. After decanting, the aqueous phase is found to contain 4.3 g/l of $As^{+3}$ (29.5% extraction).

The extraction is repeated on a further 20 ml sample of the same aqueous solution but using a 6% solution of tetradecane-1,2-diol in 2-ethylhexanol instead of 2-ethylhexanol alone. After decanting, the aqueous phase is found to contain 1.95 g/l of $As^{+3}$ (68% extraction).

EXAMPLE 2

The procedure of Example 1 is followed, but using a 6% solution of tetradecane-1,2-diol in 9:1 decane-isodecanol. After decanting, the aqueous phase contains 1.13 g/l of $As^{+3}$ (81.5% extraction).

EXAMPLE 3

Using the procedure described in the two previous examples, 2×20 ml portions of an aqueous solution containing:
200 g/l of sulphuric acid
45 g/l of copper
6.8 g/l of pentavalent arsenic
are extracted. Using 2-ethylhexanol, an aqueous phase is obtained containing 6.55 g/l of $As^{+5}$ (3.7% extraction). When extracting with a 6% solution of tetradecane-1,2-diol in 2-ethylhexanol, the aqueous phase contains 4.2 g/l of $As^{+5}$ (38% extraction).

EXAMPLE 4

The procedure of example 3 is followed, except that 9:1 decane-isodecane is used instead of the 2-ethylhexanol as solvent for the tetradecane-1,2-diol. An aqueous phase is obtained containing 2.7 g/l of $As^{+5}$ (60% extraction).

EXAMPLE 5

The aqueous solution described in Example 1 (trivalent arsenic) is extracted with an equal volume of a 10% solution of octane-1,2-diol in Solvesso 100. Solvesso 100 is an Esso commercial mixture of aromatic hydrocarbons.

An aqueous phase is obtained containing 0.90 g/l of trivalent arsenic (85% extraction).

EXAMPLE 6

The aqueous solution described in Example 3 (pentavalent arsenic) is used in the procedure of Example 5.

An aqueous phase is obtained containing 1.10 kg/l of pentavalent arsenic (84% extraction).

EXAMPLE 7

The aqueous solution described in Example 1 is extracted with an equal volume of a 10% solution of 2-phenylpropane-1,2-diol in 9:1 solvesso 100-isodecanol.

An aqueous solution is obtained containing 2.00 g/l of trivalent arsenic (67% extraction).

EXAMPLE 8

The aqueous solution described in Example 3 is used in the procedure of Example 7.

An aqueous solution is obtained containing 3.00 g/l of pentavalent arsenic (56% extraction).

EXAMPLE 9

The aqueous solution described in Example 1 is extracted with an equal volume of a 15% solution in Solvesso of a mixture consisting of isomer dodecanediols with vicinal hydroxyls in different positions, this mixture being obtained by hydroxylation of a propene tetramer.

An aqueous solution is obtained containing 2.5 g/l of trivalent arsenic (59% extraction).

EXAMPLE 10

The aqueous solution described in Example 3 is used in the procedure of Example 9.

An aqueous solution is obtained containing 4.7 g/l of pentavalent arsenic (31% extraction).

EXAMPLE 11

The aqueous solution discribed in Example 1 is extracted with an equal volume of a 10% solution of 2-methyl-2-propylpropane-1,3-diol in Solvesso. An aqueous solution is obtained containing 0.8 g/l of trivalent arsenic (87% extraction).

EXAMPLE 12

The aqueous solution of Example 3 is used in the procedure of Example 11. An aqueous solution is obtained containing 1.1 g/l of pentavalent arsenic (84% extraction).

EXAMPLE 13

The aqueous solution of Example 1 is extracted with an equal volume of a 20% solution of 2-ethylhexane-1,3-diol in Solvesso. The aqueous solution contains 1.3 g/l of trivalent arsenic (78% extraction).

EXAMPLE 14

The aqueous solution of Example 3 is extracted in the same manner as in the preceding example. An aqueous solution is obtained containing 5.3 g/l of pentavalent arsenic (22% extraction).

EXAMPLE 15

The aqueous solution of Example 1 is extracted with an equal volume of a 4% solution of dodecane-1,12-diol in 2-ethylhexane-1,2-diol. An aqueous solution is obtained containing 4.2 g/l of trivalent arsenic (33% extraction).

EXAMPLE 16

The aqueous solution of Example 3 is extracted in the same manner as in the preceding example. An aqueous solution is obtained containing 5.2 g/l of pentavalent arsenic (23% extraction).

EXAMPLE 17

A solution originating from copper refining and containing inter alia:
copper: 58 g/l
nickel: 10.5 g/l
trivalent arsenic: 0.5 g/l
pentavalent arsenic: 10.5 g/l
sulphuric acid: 168 g/l
is extracted in a single stage with three times its volume of a 6% solution of tetradecane-1,2-diol in a 9:1 mixture of ISOPAR L and isodecanol. ISOPAR L is an Esso hydrocarbon mixture of isoparaffins.

An aqueous solution is obtained containing 1.9 g/l of pentavalent arsenic (83% extraction).

EXAMPLE 18

The organic solution obtained as described in the preceding example and containing 3.0 g/l of arsenic is re-extracted twice with equal volumes of distilled water. The two aqueous solutions obtained contain 2.6 g/l and 0.34 g/l of arsenic respectively. Thus 98% of the extracted arsenic was re-extracted.

EXAMPLE 19

The organic solution regenerated as described in the preceding example is again used for extracting arsenic as described in Example 17 and subsequent re-extraction as described in Example 18. This operation is repeated a further three times. The organic solution resulting from this series of treatments is able to extract 80% of the arsenic contained in the same solution when operating with a ratio of organic phase to aqueous phase of 3:1.

We claim:

1. A process for separating arsenic from acid aqueous solutions containing arsenic and other metal ions, characterised by bringing the acid aqueous solution into contact with a waterimmiscible organic diluent consisting of hydrocarbons, alcohols or their mixtures, in which there is dissolved as solvent at least one polyol, said solvent extracting the arsenic which is then re-extracted with a counter-solvent.

2. A process as claimed in claim 1, characterised in that the solvent is a diol.

3. A process as cqueous solution into contact with a waterimmiscible organic diluent consisting of hydrocarbons, alcohols or their mixtures, in which there is dissolved as solvent at least one polyol, said solvent extracting the arsenic which is then re-extracted with a counter-solvent.

4. A process as claimed in claim 1, characterised in that the polyols are chosen from octane-1,2-diol, decane-1,2-diol, dodecane-1,2-diol, tetradecane-1,2-diol, hexadecane-1,2-diol, phenylethane-1,2-diol, 2-phenylpropane-1,2-diol, 2-ethylhexane-1,3-diol, 2,2-dimethylhexane-3,5-diol, octane-1,8-diol, dodecane-1,12-diol and 4-octylcyclohexane-1,2-diol.

5. A process as claimed in claim 1, characterised in that the polyol concentration in the diluent is between 1% and 60%.

6. A process as claimed in claim 5, characterized in that the concentration is between 4% and 40%.

7. A process as claimed in claim 1, characterised in that the diluent is chosen from aliphatic, aromatic and naphthenic hydrocarbon compounds, monohydric alcohols and ether compounds, either along or in mixture.

8. A process as claimed in claim 1, characterised in that the ratio of the organic phase (diluent plus solvent) to the acid aqueous phase is between 0.1 to 10.

9. A process as claimed in claim 8, characterised in that the ratio is between 0.5 and 5.

10. A process as claimed in claim 1, characterised in that the counter-solvent is chosen from alkaline solutions, neutral solutions, water and acid solutions.

* * * * *

UNITED STATES PATENT AND TRADEMARK OFFICE
CERTIFICATE OF CORRECTION

PATENT NO. : 4,737,350

DATED : April 12, 1988

INVENTOR(S) : Baradel et al.

It is certified that error appears in the above-identified patent and that said Letters Patent is hereby corrected as shown below:

Column 6, line 9
  Claim 3 should read as follows:

3. A process as claimed in claim 1, characterized in that the polyol, if a diol, has 7 or more carbon atoms, and if a triol has 10 or more carbon atoms.

Signed and Sealed this

Twenty-second Day of October, 1991

Attest:

HARRY F. MANBECK, JR.

*Attesting Officer*     *Commissioner of Patents and Trademarks*